United States Patent
Son

(10) Patent No.: US 7,308,512 B1
(45) Date of Patent: Dec. 11, 2007

(54) FIBER CHANNEL ADAPTOR FOR SERIAL OR PARALLEL ATA DISKS

(75) Inventor: Keith Son, Hayward, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 631 days.

(21) Appl. No.: 10/633,373

(22) Filed: Jul. 31, 2003

Related U.S. Application Data

(63) Continuation-in-part of application No. 09/860,027, filed on May 16, 2001.

(51) Int. Cl.
 G06F 3/00 (2006.01)
 G06F 13/12 (2006.01)

(52) U.S. Cl. .......................... 710/38; 710/71

(58) Field of Classification Search ............ None
 See application file for complete search history.

(56) References Cited

U.S. PATENT DOCUMENTS

| | | | |
|---|---|---|---|
| 4,075,691 A | 2/1978 | Davis et al. | |
| 4,351,023 A | 9/1982 | Richer | |
| 4,710,868 A | 12/1987 | Cocke et al. | |
| 5,088,081 A | 2/1992 | Farr | |
| 5,134,619 A | 7/1992 | Henson et al. | |
| 5,155,835 A | 10/1992 | Belsan | |
| 5,235,601 A | 8/1993 | Stallmo et al. | |
| 5,379,417 A | 1/1995 | Lui et al. | |
| 5,555,244 A | 9/1996 | Gupta et al. | |
| 5,625,840 A * | 4/1997 | Numata et al. | 710/5 |
| 5,668,943 A | 9/1997 | Attanasio et al. | |
| 5,950,203 A | 9/1999 | Stakuis et al. | |
| 5,996,086 A | 11/1999 | Delaney et al. | |
| 6,444,902 B1 | 9/2002 | Tsao et al. | |

(Continued)

FOREIGN PATENT DOCUMENTS

EP   0 569 313 A2   11/1993

(Continued)

OTHER PUBLICATIONS

Bruce Nelson et al., "How and Why SCSI Is Better than IPI for NFs", The Myth of Transfer Rate, Technical Report 6 Second Edition Jul. 1992, 1-32.

(Continued)

*Primary Examiner*—Kim Huynh
*Assistant Examiner*—Jasjit Vidwan
(74) *Attorney, Agent, or Firm*—Blakely Sokoloff Taylor & Zafman LLP

(57) ABSTRACT

Coupling disks having only a single controller connection to more than one controller. An adaptor interfaces an ATA disk with two interfaces to a backplane having a fiber channel backplane interface form factor. Switching logic controls the interfaces, so the ATA disk has redundant capability for connecting to controlling devices. The backplane communicates signals suitable to the ATA disk, while having the same form factor as a fiber channel disk. The backplane is coupled to a signal converter, so an ATA disk can be coupled to a fiber channel interface. The signal converter allows backplanes with ATA disks to be mixed with fiber channel disks, on one fiber channel loop. ATA disks are coupled to fiber channel backplanes, so fiber channel techniques are used to provide multiple controllers for them.

32 Claims, 2 Drawing Sheets

U.S. PATENT DOCUMENTS

| | | | |
|---|---|---|---|
| 6,742,068 B2 * | 5/2004 | Gallagher et al. | 710/302 |
| 2002/0174197 A1 * | 11/2002 | Schimke et al. | 709/220 |
| 2003/0041278 A1 * | 2/2003 | Lin | 714/1 |
| 2003/0191872 A1 * | 10/2003 | Barth et al. | 710/8 |

FOREIGN PATENT DOCUMENTS

| | | |
|---|---|---|
| EP | 0 760 503 A1 | 3/1997 |
| EP | 0939360 A2 * | 1/1999 |
| EP | 0 939 360 A2 | 2/1999 |
| WO | WO 01/14991 A2 | 3/2001 |
| WO | WO 01/43368 A1 | 6/2001 |

OTHER PUBLICATIONS

IBM Technical Disclosure Bulletin, "Fibre Channel Standard Hub-Loop Redundancy for Higher RAS," vol. 37, No. 04A, Apr. 1994, XP000446711.

Kleiman et al.: "Using NUMA Interconnects For Highly Available Filers," 1999 IEEE.

Nass: "Connect Disk Arrays to EISA or PCI Buses," Electronic Design, Nov. 11, 1993, Cleveland, OH, US. XP000417908.

* cited by examiner

FIBER CHANNEL ADAPTOR FOR SERIAL OR PARALLEL ATA DISKS

This application is a Continuation-in-part of the prior application for "RELIABLE COUPLING TO AN ARRAY OF DISK STORAGE DEVICES USING SINGLE INITIATOR, NON-HOTPLUG INTERFACES" filed by David Bulfer, Steven Kleiman, and Keith Son on May 16, 2001 (U.S. patent application Ser. No. 09/860,027).

BACKGROUND OF THE INVENTION

1. Field of the Invention

The invention relates to mass storage devices.

2. Related Art

It is often useful for mass storage, including disk drives and disk drive subsystems, to be coupled to more than one access point, such as for example more than one computer system, file server, caching device, or other system used for accessing that mass storage. For example, it is often useful for mass storage systems to be redundantly coupled to provide failover or load balancing, or to be multiply connected in the service of providing clustering, high availability, or hot swapping. Known systems for multiply coupling mass storage include SCSI (small computer systems interface) and FC-AL (fiber channel arbitrated loop). While these known systems are relatively robust in their ability to provide multiple coupling for mass storage systems, they have the drawback that they are relatively expensive and have relatively lower storage density per unit cost.

One problem with the known art is that some mass storage systems, including those mass storage devices and subsystems with the least cost and greatest storage density per unit cost, are not well-suited for being coupled to more than one controller. Examples include ATA disks, such as for example S-ATA (serial ATA) disk drives and P-ATA (parallel ATA) disk drives. Accordingly, it would be advantageous to be able to couple such mass storage systems to more than one controlling system. Moreover, it would also be advantageous to be able to use systems or techniques that are available for use with SCSI or FC-AL to provide robust multiple connectivity, with the effect of allowing such mass storage systems (for example, relatively inexpensive ATA disk drives) with systems and techniques for failover, load balancing, clustering, high availability, and hot swapping.

Accordingly, it would be advantageous to provide techniques by which disk drives having only a single controller connection might be connected to more than one controlling device.

SUMMARY OF THE INVENTION

The invention provides a method and system capable of coupling disk drives having only a single controller connection to more than one controlling device. In one embodiment, an adaptor provides an ATA disk drive with at least one interface, and preferably two independent interfaces, to a connector substantially like a fiber channel backplane (or another type of backplane, not necessarily limited to fiber channel type backplanes), and having a form factor substantially like a fiber channel backplane interface (or another type of backplane, not necessarily limited to fiber channel type backplanes). The two independent interfaces are capable of being controlled by switching logic, with the effect that the ATA disk drive is provided with redundant capability for connecting to controlling devices.

In an aspect of the invention, the switching logic is capable of determining which one of the two independent interfaces is used by the ATA disk drive, with the effect that the ATA disk drive can be redundantly coupled to a fiber channel loop, or any other type of redundant storage access structure.

In an aspect of the invention, the fiber channel (or other) backplane is capable of communicating signals suitable to the ATA disk drive, while having an interface to the ATA disk drive substantially with the same form factor as for a fiber channel disk drive (or other disk drive suited to the backplane). In alternative embodiments, the fiber channel (or other) backplane is capable of communicating signals suitable to an industry-standard fiber channel (or other) backplane, with the effect that ATA disk drives and FC disk drives can be coupled to the same fiber channel backplane.

In an aspect of the invention, the fiber channel (or other) backplane is coupled to an ATA/FC signal converter, with the effect that an ATA disk drive can be coupled to an interface designed to couple with a fiber channel disk drive (or other disk drive suited to the backplane). Similarly, the ATA/FC signal converter provides the capability for fiber channel (or other) backplanes coupled to ATA disk drives to be mixed with fiber channel (or other) backplanes coupled to fiber channel disk drives (or other disk drives suited to the backplane), on the identical fiber channel loop (or another redundant storage access structure).

One advantage provided by these aspects of the invention is that ATA disk drives (and other non-FC disk drives) can be coupled to fiber channel (or other) backplanes, with the effect that industry-standard (and nonstandard) fiber channel (or other) techniques can be used to provide multiple controllers for such disk drives, and to provide advantages allowed by such multiple controllers (such as for example, failover, load balancing, clustering, high availability, and hot swapping).

A second advantage provided by these aspects of the invention is that disk drives of differing types (such as for example P-ATA and S-ATA disk drives) can be coupled to a common storage access structure, with the effect that P-ATA and S-ATA disk drives (a) can be used concurrently without inducing substantial additional complexity, and (b) can have data transferred there-between without specific hardware for converting between parallel-to-serial or serial-to-parallel disk drive interfaces.

A third advantage provided by these aspects of the invention is that disk drives of differing types (such as for example ATA and fiber channel disk drives) can be coupled to a common storage access structure, even when those disk drives have substantially different form factors and interfaces, with the effect that a common form factor and interface (such as for example a fiber channel disk drive form factor and interface) can be used in a storage access structure. Use of a common form factor and interface can reduce physical and other stresses on the actual disk drives included in the housing.

In preferred embodiments, the system includes (1) a housing for an ATA disk drive, such as for example a P-ATA or an S-ATA disk drive, capable of allowing an ATA drive to be fitted to another type of form factor or interface, such as for example a fiber channel drive form factor and interface, (2) an adaptor capable of coupling the ATA disk drive to a backplane, such as for example a fiber channel backplane, the adaptor having two independent interfaces, and (3) first switching logic capable of selecting between the two independent interfaces, with the effect that the ATA disk drive can be redundantly coupled to a storage system. The first switching logic might include hardware, firmware, software, or a combination or mixture thereof, and might be programmable. The first switching logic might also include control of a switched signal capable of supplying power to the disk drive.

In such embodiments, the system preferably also includes (4) converters between parallel and serial ATA disk drive signals, (5) output connectors coupled to the converters, and (6) second switching logic capable of coupling a selected converter to a selected output connector. The second switching logic might also include hardware, firmware, software, or a combination or mixture thereof, and might be programmable. The second switching logic might also include control of a switched signal capable of supplying power to the disk drive.

INCORPORATED DISCLOSURE

Figure 1:
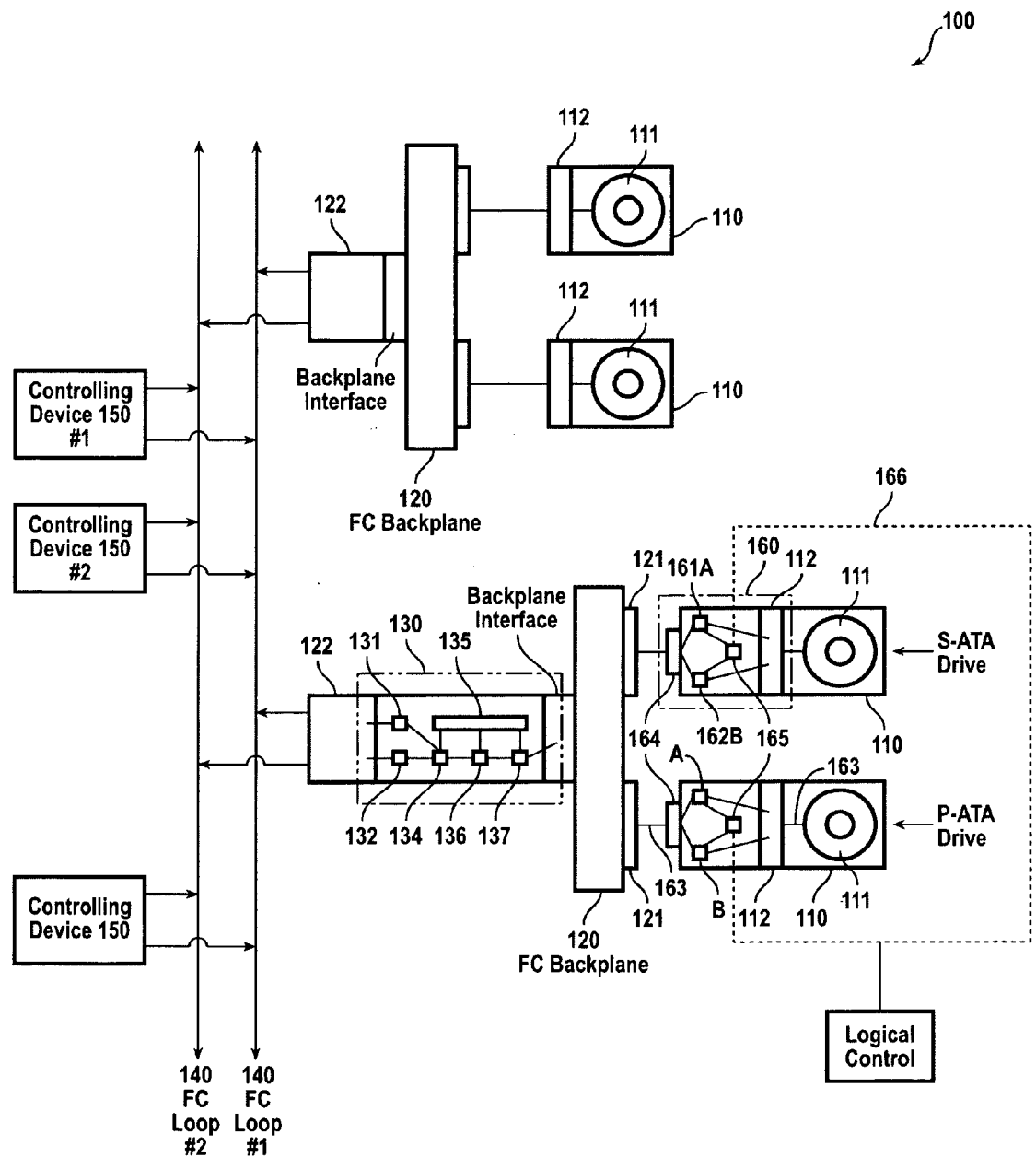
FIG. 1 shows a block diagram of a system including serial or parallel ATA disk drives, an adaptor capable of coupling to them and capable of coupling to a fiber channel backplane, and connectors capable of coupling multiple fiber channel backplanes to multiple fiber channel loops.

Inventions described herein can be used in conjunction with technology described in the following documents:
  U.S. patent application Ser. No. 09/860,027, filed May 16, 2001, in the name of David BULFER, Steven KLEIMAN, and Keith SON, titled "Reliable Coupling to an Array of Disk Storage Devices Using Single Initiator, Non-Hotplug Interfaces", and applications claiming priority therefrom.
  These documents are hereby incorporated by reference as if fully set forth herein, and are sometimes referred to herein as the "incorporated disclosure."
  This application claims priority, to the fullest extent permitted by law, from the incorporated disclosure.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography
  The general meaning of each of these following terms is intended to be illustrative and in no way limiting.
    The phrases "mass storage," "mass storage system," and similar phrases and terms, generally describe systems in which data can be maintained, stored or retrieved. As used herein, these phrases are intentionally broad. In the context of the invention, there is no particular requirement that "mass storage" must be relatively large or heavy.
    The phrases "disk drive," "disk drive subsystem," and similar phrases and terms, generally describe systems in which data can be maintained, stored or retrieved, such as for example systems using spinning disks and magnetic, optical, or a combination of magnetic and optical techniques. As used herein, these phrases are intentionally broad. Although one embodiment uses a set of individual disk drives, in the context of the invention, there is no particular requirement for using individual disk drives.
    The phrase "access point," and similar phrases and terms, as applied to a disk drive, disk drive subsystem, or mass storage system, generally describe elements of a disk drivem, disk drive system, or mass storage system, from which data maintained thereon might be stored, retrieved, or manipulated. As used herein, this phrase is intentionally broad, and might include a computer system, file server, caching device, or other system used for accessing mass storage.
    The phrase "system for accessing," and similar phrases and terms, as applied to a disk drive, disk drive subsystem, or mass storage system, describes any device for giving instructions to, making requests of, sending data to, or receiving data or responses from, any mass storage system. As used herein, this phrase is intentionally broad, and might include a computer system, file server, caching device, or other system used for accessing mass storage. As used herein, this phrase is intentionally broad, and might include anything as described by the phrases "controller," "controlling device," "controlling system," and similar phrases.
    The phrases "multiple connectivity," "multiple coupling," "redundant capability," "redundant connectivity," "redundant coupling," "robust connectivity," "robust multiple connectivity," and similar phrases and terms, generally describe systems in which there is the possibility of more than one connection from an external point to stored data. As used herein, these phrases are intentionally broad, and might include any technique for providing failover, load balancing, clustering, high availability, hot swapping, or other techniques used for accessing mass storage using multiple connections.
    The phrase "independent interface," and similar phrases and terms, as applied to a disk drive, disk drive subsystem, or mass storage system, generally describe portions of systems by which data can be accessed without use of other interfaces. As used herein, these phrases are intentionally broad, and might include any technique for providing multiple connections between that mass storage system and one or more systems for accessing that mass storage system.
    The phrases "backplane," "fiber channel backplane," and similar phrases and terms, generally describe portions of systems in which data could be sent, received, or otherwise transferred among elements coupled to a common medium, such as for example a backplane or fiber channel backplane. As used herein, these phrases are intentionally broad, and include other types of backplane interface besides standards known by the phrase "fiber channel" and similar phrases.
    The phrase "form factor" generally describes an aspect of a system relating to physical dimensions and shape, such as for example a shape of a disk drive housing that could be fit into a disk drive housing holder. As used herein, this phrase is intentionally broad.
    The phrases "logical switch," "switching logic," and similar phrases and terms, generally describe techniques by which a choice of more than one signal could be made, or by which more than one signal could be combined into one signal. As used herein, these phrases are intentionally broad.

The phrases "fiber channel loop," and similar phrases and terms, generally describe interfaces among devices using fiber channel communication techniques. As used herein, these phrases are intentionally broad, and include other types of backplane interface besides standards known by the phrase "fiber channel" and similar phrases.

Other and further applications of the invention, including extensions of these terms and concepts, would be clear to those of ordinary skill in the art after purchasing this application. These other and further applications are part of the scope and spirit of the invention, and would be clear to those of ordinary skill in the art without further invention or undue experimentation.

The scope and spirit of the invention is not limited to any of these definitions, or to specific examples mentioned therein, but is intended to include the most general concepts embodied by these and other terms.

System Elements

FIG. 1 shows a block diagram of a system including serial or parallel ATA disk drives, an adaptor capable of coupling to them and capable of coupling to a fiber channel backplane, and connectors capable of coupling multiple fiber channel backplanes to multiple fiber channel loops.

A system 100 includes a set of disk drive housings 110, a set of fiber channel backplanes 120, a set of backplane couplers 130, a set of fiber channel loops 140, and a set of controlling devices 150.

Disk Drive Housings

Each disk drive housing 110 includes a disk drive 111, having a disk drive interface 112 by which external devices communicate with the disk drive 111. In one embodiment, as described herein, the disk drive 111 might include an ATA disk drive, such as for example a P-ATA (parallel ATA) disk drive or an SATA (serial ATA) disk drive, that is, a disk drive 111 with a disk drive interface 112 responding according to known specifications for P-ATA or S-ATA disk drives. In other embodiments, as also described herein, the disk drive 111 might include an FC (fiber channel) disk drive, that is, a disk drive 111 with disk drive interface 112 responding according to known specifications for FC disk drives.

Each disk drive housing 110 has a physical form factor and a set of electrical connections compatible with a known specification for FC disk drives. This has the effects that (a) each disk drive housing 110 can be physically and electrically coupled to one of the fiber channel backplanes 120, and (b) each disk drive housing 110, being physically compatible with the fiber channel backplanes 120, does not impose any additional physical stress on connectors between that disk drive housing 110 and that fiber channel backplane 120, than might be imposed if there were more than one physical form factor used for the disk drive housings 110. However, as further described below, while each disk drive housing 110 has a physical form factor compatible with a known specification for FC disk drives, in the context of the invention, there is no particular requirement that any of the disk drive housings 110 are electrically compatible with known specifications for FC disk drives, and in fact, in one embodiment, at least some of the disk drive housings 110 use a set of electrical signals possibly incompatible with known specifications for FC disk drives.

After reading this application, those skilled in the art would recognize that disparate disk drive housings 110, having distinct types, might be coupled to the same fiber channel backplane 120. Those disk drive housings 110 might have different types of disk drives 111 or different types of disk drive interfaces 112.

For a first example, some of those disk drive housings 110 might have P-ATA disk drives 111, while others of those disk drive housings 110 might have S-ATA disk drives 111, as further described below.

For a second example, some of those disk drive housings 110 might have ATA disk drives 111, while others of those disk drive housings 110 might have FC disk drives 111.

For a third example, some of those disk drive housings 110 might have more involved disk drive subsystems or mass storage, such as for example RAID disk drive subsystems or other types of highly-available, redundant, or otherwise intelligently controlled disk drive subsystems or mass storage.

Those disk drive housings 110 having ATA disk drives 111 include an adaptor 160 coupled to the disk drive interface 112, with the effects of (a) being capable of receiving signals from the disk drive interface 112 and (b) being capable of sending signals to the disk drive interface 112.

Switching Adaptor

The adaptor 160 includes a first communication path 161 and a second communication path 162, each of which is coupled to the disk drive interface 112 using a known disk drive connector 163 (such as for example a P-ATA connector or an S-ATA connector). The first communication path 161 and the second communication path 162 are each coupled to a backplane connector 164 having a physical form factor compatible with the fiber channel backplane 120.

In one embodiment, of the first communication path 161 and the second communication path 162, either one or both might include a serial-to-parallel converter or a parallel-to-serial converter (or neither), with the effect that P-ATA disk drives 111 and S-ATA disk drives 111 are capable of intercommunicating using the fiber channel bus 120 and one or more adaptors 160. Thus, the disk drive connector 163 might be either a P-ATA connector or an S-ATA connector, with the effect that P-ATA disk drives 111 and S-ATA disk drives 111 are each capable of being coupled to the adaptor 160.

However, in the context of the invention, there is no requirement the backplane connector 164 uses standard electrical signals for a fiber channel backplane 120 (such as for example the specification for fiber channel backplane 120 electrical signals found in the SFF-8045 document, available on the web via www.sff.org, hereby incorporated by reference as if fully set forth herein). Rather, in one set of embodiments, the backplane connector 164 uses a set of electrical signals not standard to a fiber channel backplane 120, but instead capable of coupling both the first communication path 161 and the second communication path 162 to separate signal communication lines on the fiber channel backplane 120. In such embodiments, the fiber channel backplane 120 is disposed to communicate a first data signal "A" (coupled to the first communication path 161), and a set of control signals associated therewith, and a like set of signals for a second data signal "B" (coupled to the second communication path 162).

For example, the control signals associated with each of the first data signal "A" and the second data signal "B" might include:

a set of transmit and receive signals (such as for example those sometimes known as Tx+/− and Rx+/−);

a set of power and ground signals (such as for example a +12 volt power signal, a +5 volt power signal, a grounded power signal, and a ground-to-frame power signal); and a set of other known control signals.

The adaptor 160 includes a logical switch 165 coupled to the first communication path 161 and the second communication path 162, and capable of disabling or enabling the first communication path 161 or the second communication path 162, with the effect of selecting which one is coupled between the disk drive connector 163 and the backplane connector 164. In one embodiment, the switch 165 might include hardware, firmware, or software, and might be programmable, with the effect that the switch 165 is capable of making a switching decision in response to information on the first communication path 161 or the second communication path 162.

Figure 2:
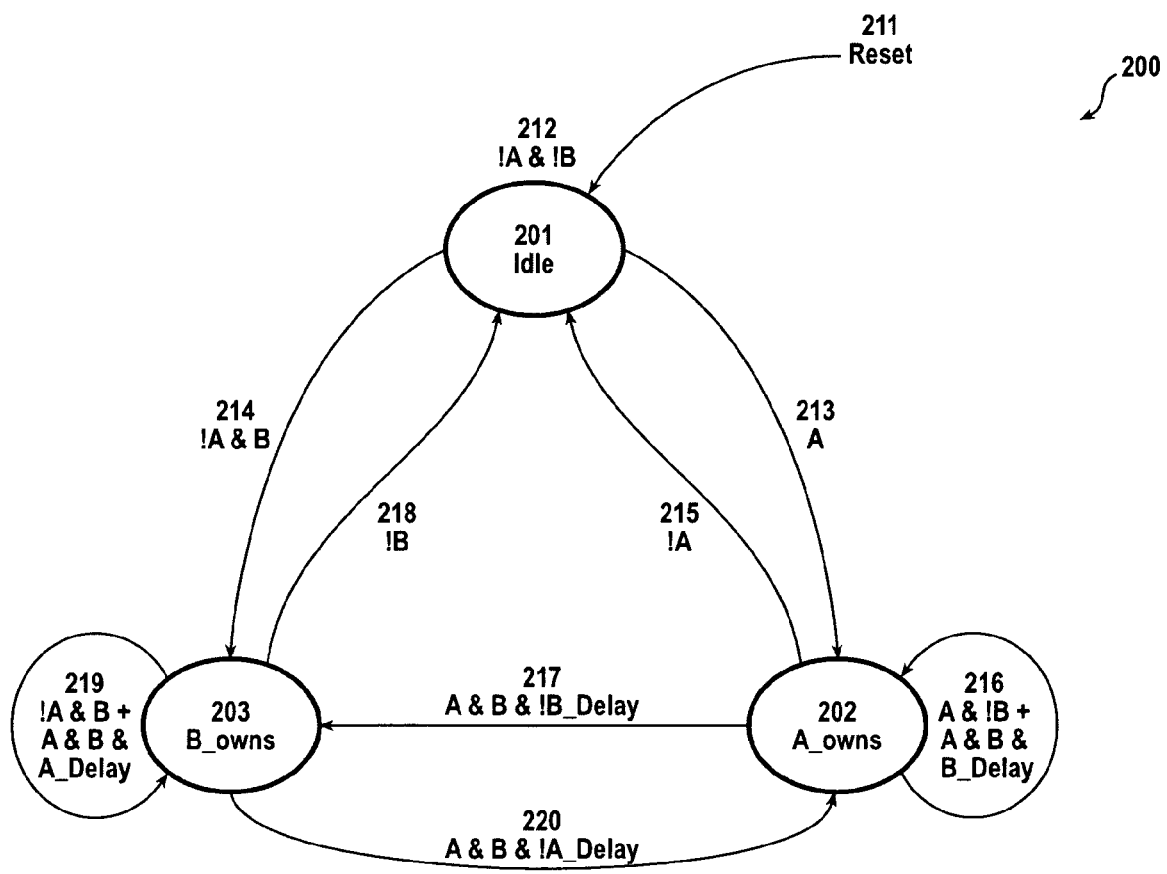
FIG. 2 shows a state transition diagram used in a system for controlling programmable first or second switching logic as described above.

In such embodiments, the switch 165 is coupled to an external switching signal 166. The external switching signal 166 might include information for an explicit switching decision, or might include instructions capable of being interpreted by the switch 165 (or a computing device located therein, or coupled thereto) for making a switching decision. In one embodiment, the switch 165 is pre-selected with known instructions, with the effect of following a state diagram such as shown in FIG. 2 below.

Fiber Channel Backplane

Each fiber channel backplane 120 includes a backplane compatible with a known fiber channel standard, such as for example the specification for a fiber channel backplane, its physical form factor and its electrical signals, found in the SFF-8045 document described and incorporated above, and sometimes referred to herein as the "fiber channel standard."

The fiber channel backplane 120 includes a backplane communication link 121 compatible with the same fiber channel standard. As further described in the fiber channel standard, the backplane communication link 121 includes forty control signals suitable for communication among FC disk drives 111. However, as further described in this application, in one embodiment the backplane 121 includes two sets of forty control signals (multiplexed 2:1 by the logical switch 165 to forty control signals), suitable for communication among ATA disk drives 111, as mediated by the adaptor 160 and its logical switch 165.

The fiber channel backplane 120 includes a backplane controller 122 compatible with same fiber channel standard. As further described in the fiber channel standard, the backplane controller 122 is capable of sending and receiving communications between disk drives 111 and the fiber channel backplane 120. As further described in that document, the backplane controller 122 is capable of sending and receiving communications between the fiber channel backplane 120 and one or more fiber channel loops 140. However, as further described in this application, in one embodiment the backplane controller 122 includes a backplane coupler 130, capable of sending and receiving signals between the ATA disk drives 111 and the one or more fiber channel loops 140.

Backplane Coupler

Each fiber channel backplane 120 having ATA disk drives 111 coupled to it also has a backplane coupler 130 coupled to it, and capable of sending and receiving signals between the fiber channel backplane 120 and the one or more fiber channel loops 140.

Each backplane coupler 130 includes fiber channel translation device 137 coupled using one of its backplane communication links 121 to the first communication path 161 and the second communication path 162 at one of the adaptors 160. The fiber channel translation device 137 receives the ATA signals from the fiber channel bus 130, and translates them to fiber channel standard signals. The fiber channel translation device 137 is coupled to a processor 136 and a memory 135, each of which are coupled to each other and to a PCI bus 134. The PCI bus 134 is coupled to a first communication port 131 and a second communication port 132.

After reading this application, those skilled in the art will recognize that the PCI bus 134, the memory 135, and the processor 136, each operate as such known devices, with the processor 136 being under control of instructions it interprets to perform functions involved in translating between ATA-compatible signals and FC-compatible signals. The fiber channel translation device 137 sends and receives signals between the memory 135 and the processor 136 (on the one hand), and the backplane communication link 121 (on the other hand).

Fiber Channel Loops

Each fiber channel loop 140 couples a set of fiber channel backplanes 120 in series, with the effect that each disk drive 111 coupled to at least one of the fiber channel backplanes 120 is capable of communication with each controlling device 150 coupled to that fiber channel loop 140.

In one embodiment, more than one such fiber channel loop 140 is available for communication, with the effect that each controlling device 150 coupled to those fiber channel loops 140 is capable of communication with each disk drive 111 coupled to at least one of the fiber channel backplanes 120 coupled to those fiber channel loops 140.

Controlling Devices

As described above, the controlling devices 150 might include any system for accessing one or more of the disk drives 111 or disk drive interfaces 112, and might include for example any computer system, file server, caching device, or other system used for accessing mass storage. For example, any device having the capability of being a controller, controlling device, or controlling system, for disk drives or other mass storage, might be included within the capability of one or more of the controlling devices 150. Similarly, any device having the function of providing access to disk drives or other mass storage, such as for example, any file system, filer, FAS (fabric attached storage), JBOD ("just a bunch of disks"), LUN (local unit network), NAS (network attached storage), SAN (storage area network), SAN/NAS appliance, virtual disk, database, data container, data repository, or any other device or system having the capability of receiving and responding to requests relating to storage, retrieval, or maintenance of data, might be included within the capability of one or more of the controlling devices 150.

After reading this application, those skilled in the art would recognize that each such controlling device 150 has more than one path by which it might access each of the disk drives 111 or disk drive interfaces 112, with the effect that each of the disk drives 111 or disk drive interfaces 112 is described herein as having more than one access point or independent interface, and with the effect that each of the disk drives 111 or disk drive interfaces 112 is described herein as having multiple connectivity (to the controlling devices 150), multiple coupling thereto, redundant capability (for being accessed thereby), redundant connectivity thereto, redundant coupling thereto, robust connectivity thereto, or robust multiple connectivity thereto.

After reading this application, those skilled in the art would recognize that each such controlling device 150 with multiple connectivity to disk drives 111 (or disk drive interfaces 112) is capable of performing known techniques in any type of redundant storage access structure for redundant and robust use of storage on those disk drives 111. These known techniques include failover, load balancing, clustering, high availability, hot swapping, and other advantages allowed by multiple controlling devices 150 interfacing with multiple disk drives 111 (or disk drive interfaces 112).

State Transition Diagram

FIG. 2 shows a state transition diagram used in a system for controlling programmable first or second switching logic as described above.

A state transition diagram 200 includes a set of states 201 (Idle), 202 (A Owns), and 203 (B Owns), a set of transitions for those states, subject to signals relating to those transitions.

A transition 211, responsive to a "reset" signal, causes the system to enter the state 201 (Idle), that is, neither the first communication path 161 ("A") nor the second communication path 162 ("B") controls the connection between the disk drive interface 112 and the fiber channel backplane 120.

A transition 212, responsive to an "A" signal (that is, A desires to own the connection) and to a "B" signal (that is, B desires to own the connection), causes the system from the state 201 (Idle) to re-enter the state 201 (Idle) if the value (!A & !B) is logically true, where !X indicates negation of a logical value X.

A transition 213 causes the system from the state 201 (Idle) to enter the state 202 (A Owns) if the value (A) is logically true.

A transition 214 causes the system from the state 201 (Idle) to enter the state 203 (B Owns) if the value (!A & B) is logically true.

A transition 215 causes the system from the state 202 (A Owns) to enter the state 201 (Idle) if the value (!A) is logically true.

A transition 216, responsive to the A signal and the B signal, and to a "B_Delay" signal indicative of a transmission delay on the second communication path 162 ("B"), causes the system from the state 202 (A Owns) to re-enter the state 202 (A Owns) if the value ((A & !B) or (A & B & B_Delay)) is logically true.

A transition 217 causes the system from the state 202 (A Owns) to enter the state 203 (B Owns) if the value (A & B & !B_Delay) is logically true.

A transition 218 causes the system from the state 203 (B Owns) to enter the state 201 (Idle) if the value (!B) is logically true.

A transition 219, responsive to the A signal and the B signal, and to an "A_Delay" signal indicative of a transmission delay on the first communication path 161 ("A"), causes the system from the state 203 (B Owns) to re-enter the state 203 (B Owns) if the value ((!A & B) or (A & B & A_Delay)) is logically true.

A transition 220 causes the system from the state 203 (B Owns) to enter the state 202 (A Owns) if the value (A & B & !A_Delay) is logically true.

After reading this application, those skilled in the art would understand that other state transition diagrams 200 could also be suitable for controlling the system, that such other state transition diagrams 200 are within the scope and spirit of the invention, and that such other state transition diagrams 200 could be implemented without either undue experimentation or further invention.

Alternative Embodiments

Although preferred embodiments are disclosed herein, many variations are possible which remain within the concept, scope, and spirit of the invention. These variations would become clear to those skilled in the art after perusal of this application.

The invention applies to any mass storage device or system, and is not limited to disk drives or their equivalents.

The invention applies to any form of mass storage controller, and is not limited to S-ATA, P-ATA, or fiber channel disk drives.

The invention applies to any form of adaptor between mass storage device or system form factors, and is not limited to S-ATA, P-ATA, or fiber channel disk drives.

The invention applies to systems including any form of switch, and is not limited to the programmable switches described herein.

The invention applies to systems having multiple connectivity with relatively complete redundancy, to systems having multiple connectivity but without such redundancy, and to systems not having multiple connectivity.

The invention applies to systems having any form of inter-disk connectivity, and is not limited to fiber channel backplanes or to fiber channel loops.

The invention applies to systems in which the disk drives connected to a single backplane are heterogeneous, and to systems in which the disk drives connected to a single backplane are not heterogeneous.

The invention applies to systems in which signals are converted between any types of disk drives, controllers, or backplanes, and is not limited to conversion between ATA and fiber channel signals.

The invention applies to systems including techniques for failover, load balancing, clustering, high availability, and hot swapping, and to systems not including such techniques.

After reading this application, those skilled in the art will recognize that these alternative embodiments are illustrative and in no way limiting.

The invention claimed is:

1. An apparatus comprising:
a disk drive housing defining a volume large enough to include an ATA disk drive therein, said disk drive housing having a form factor and electrical interface compatible with a fiber channel disk drive housing;
an adaptor in said housing, said adaptor including an ATA disk drive coupling element and at least two fiber channel backplane coupling elements;
a programmable switch coupled to said fiber channel backplane coupling elements to control selection of one of at least two paths, wherein at least one of said at least two paths is connected to one of said fiber channel backplane coupling elements, wherein the ATA disk drive is coupled to a fiber channel backplane via a selected one of the at least two paths without physically removing the ATA disk drive from the disk drive housing;
a serial-to-parallel converter in a first one of the at least two paths, said serial-to-parallel converter being within said disk drive housing and coupled to said ATA disk drive coupling element, wherein said serial-to-parallel converter is capable of receiving a set of serial ATA disk drive signals from a serial ATA disk operatively coupled to said ATA disk drive and emitting a set of parallel ATA disk drive signals; and a parallel-to-serial converter in a second one of the at least two paths, said parallel-to-serial converter being within said disk drive housing and coupled to said ATA disk drive coupling element, wherein said parallel-to-serial converter is capable of receiving a set of parallel ATA disk drive signals from a parallel ATA disk operatively coupled to said ATA disk drive and emitting a set of serial ATA disk drive signals.

2. Apparatus as in claim 1, wherein each of said fiber channel backplane coupling elements includes an port capable of being coupled to a power source, whereby said ATA disk drive coupling is capable of receiving input power from a selectable source.

3. Apparatus as in claim 1, wherein said switch includes an input port capable of receiving instructions, said instructions being interpretable by a computing device to control said switch.

4. An apparatus comprising:
a disk drive housing including an ATA disk drive, said disk drive housing having a form factor and electrical interface compatible with a fiber channel disk drive housing;
an adaptor in said housing, said adaptor including an ATA disk drive coupling element coupled to said ATA disk drive, and at least two fiber channel backplane coupling elements;
a switch coupled to said fiber channel backplane coupling elements to select one of at least two paths in response to a switching signal, wherein at least one of said at least two paths is connected to one of said fiber channel backplane coupling elements, wherein the ATA disk drive is coupled to a fiber channel backplane via a selected one of the at least two paths without physically removing the ATA disk drive from the disk drive housing;
a serial-to-parallel converter in a first one of the at least two paths, said serial-to-parallel converter being within said disk drive housing and coupled to said ATA disk drive coupling element, wherein said serial-to-parallel converter is capable of receiving a set of serial ATA disk drive signals from a serial ATA disk operatively coupled to said ATA disk drive and emitting a set of parallel ATA disk drive signals; and
a parallel-to-serial converter in a second one of the at least two paths, said parallel-to-serial converter being within said disk drive housing and coupled to said ATA disk drive coupling element, wherein said parallel-to-serial converter is capable of receiving a set of parallel ATA disk drive signals from a parallel ATA disk operatively coupled to said ATA disk drive and emitting a set of serial ATA disk drive signals.

5. Apparatus as in claim 4, wherein each of said fiber channel back-plane coupling elements includes an port capable of being coupled to a power source, whereby said ATA disk drive is capable of receiving input power from a selectable source.

6. Apparatus as in claim 4, wherein said switch includes an input port capable of receiving instructions, said instructions being interpretable by a computing device to control said switch.

7. An apparatus comprising:
a disk drive housing including an ATA disk drive, said disk drive housing having a form factor and electrical interface compatible with a fiber channel disk drive housing;
an adaptor in said housing, said adaptor including an ATA disk drive coupling element coupled to said ATA disk drive, and at least two fiber channel backplane coupling elements; and
a first switch coupled to said fiber channel backplane coupling elements, said first switch being capable of being coupled to a switching signal;
a first path from said first switch to said ATA disk drive, said first path including a serial-to-parallel converter, wherein said serial-to-parallel converter is capable of receiving a set of serial ATA disk drive signals from a serial ATA disk operatively coupled to the ATA disk drive and emitting a set of parallel ATA disk drive signals;
a second path from said first switch to said ATA disk drive, wherein said second path includes a parallel-to-serial converter capable of receiving a set of parallel ATA disk drive signals from a parallel ATA disk operatively coupled to the ATA disk drive and emitting a set of serial ATA disk drive signals, wherein at least one of said first and second paths is connected to one of said at least two fiber channel backplane coupling elements; and
a second switch coupled to said first path and said second path, said second switch being capable of selecting a connection to said ATA disk drive using either said first path or said second path without physically removing the ATA disk drive from the disk drive housing.

8. Apparatus as in claim 7, wherein each of said fiber channel back-plane coupling elements includes an port capable of being coupled to a power source, whereby said ATA disk drive is capable of receiving input power from a selectable source.

9. Apparatus as in claim 7, wherein said first switch includes an input port capable of receiving instructions, said instructions being interpretable by a computing device to control said first switch.

10. Apparatus as in claim 7, wherein said second switch includes an input port capable of receiving instructions, said instructions being interpretable by a computing device to control said second switch.

11. Apparatus as in claim 7, wherein said second switch is capable of being coupled to a second switching signal.

12. An apparatus comprising:
a first housing including (a) a first ATA disk drive having a parallel ATA disk drive coupling element, said first housing having a form factor and electrical interface compatible with a fiber channel disk drive housing, (b) a first adaptor in said first housing, said first adaptor including an ATA disk drive coupling element coupled to said first ATA disk drive, and at least two fiber channel backplane coupling elements, and (c) a switch coupled to said fiber channel backplane coupling elements in said first housing, said switch being capable of selecting one path out of at least two paths in response to a switching signal, wherein at least one of said at least two paths is connected to one of said at least two fiber channel backplane coupling elements, wherein the first ATA disk drive is coupled to a fiber channel backplane via a selected one of the at least two paths without physically removing the first ATA disk drive from the disk drive housing;
a second housing including (a) a second ATA disk drive, said second housing having a form factor and electrical interface compatible with a fiber channel disk drive housing, (b) a second adaptor in said second housing, said second adaptor including an ATA disk drive coupling element coupled to said second ATA disk drive, and at least two fiber channel backplane coupling elements, and (c) a switch coupled to said fiber channel backplane coupling elements in said second housing, said switch being capable of being coupled to a switching signal;

a fiber channel backplane coupled to said first housing and to said second housing;

a serial-to-parallel converter in a first path of said at least two paths in said first housing, said serial-to-parallel converter being coupled to said ATA disk drive coupling element, wherein said serial-to-parallel converter is capable of receiving a set of serial ATA disk drive signals from a serial ATA disk and emitting a set of parallel ATA disk drive signals; and a parallel-to-serial converter in a first path of said at least two paths in said first housing, said parallel-to-serial converter being coupled to said ATA disk drive coupling element, wherein said parallel-to-serial converter is capable of receiving a set of parallel ATA disk drive signals from a parallel ATA disk and emitting a set of serial ATA disk drive signals.

13. Apparatus as in claim 12, wherein said second ATA disk drive includes a serial ATA disk drive coupling element.

14. Apparatus as in claim 12, wherein each of said fiber channel back-plane coupling elements includes an port capable of being coupled to a power source, whereby each of said ATA disk drives is capable of receiving input power from a selectable source.

15. Apparatus as in claim 12, wherein either said first switch or said second switch includes an input port capable of receiving instructions, said instructions being interpretable by a computing device to control either said first switch or said second switch.

16. An apparatus comprising:
an ATA disk drive coupling element;
at least two fiber channel backplane coupling elements;
a first programmable switch coupled to said fiber channel backplane elements, wherein an ATA disk drive is capable of being coupled to a selected one of said at least two fiber channel backplane coupling elements in response to said first programmable switch;
a second programmable switch coupled to said ATA disk drive, said second programmable switch is capable of communicatively coupling said ATA disk drive to one of at least two paths without removing the ATA disk drive from the ATA disk drive coupling element, wherein at least one of said at least two paths is connected to one of said at least two fiber channel backplane coupling elements;
a serial-to-parallel converter in a first path of the at least two paths, said serial-to-parallel converter being within said disk drive housing and coupled to said ATA disk drive coupling element, wherein said serial-to-parallel converter is capable of receiving a set of serial ATA disk drive signals from a serial ATA disk operatively coupled to the ATA disk drive and emitting a set of parallel ATA disk drive signals; and
a parallel-to-serial converter in a second path of the at least two paths, said parallel-to-serial converter being within said disk drive housing and coupled to said ATA disk drive coupling element, wherein said parallel-to-serial converter is capable of receiving a set of parallel ATA disk drive signals from a parallel ATA disk operatively coupled to the ATA disk drive and emitting a set of serial ATA disk drive signals.

17. Apparatus as in claim 16, wherein each of said fiber channel back-plane coupling elements includes a port capable of being coupled to a power source, whereby said ATA disk drive coupling is capable of receiving input power from a selectable source.

18. Apparatus as in claim 16, wherein said switch includes an input port capable of receiving instructions, said instructions being interpretable by a computing device to control said switch.

19. An apparatus comprising:
an ATA disk drive coupling element capable of being coupled to an ATA disk drive, said ATA disk drive coupling element and said ATA disk drive being disposable within a disk drive housing having a form factor and electrical interface compatible with a fiber channel disk drive housing;
at least two fiber channel backplane coupling elements;
a switch coupled to said fiber channel backplane coupling elements, said switch being capable of selecting one path out of at least two paths in response to a switching signal, wherein at least one of said at least two paths is connected to one of said at least two fiber channel backplane coupling elements, wherein the ATA disk drive is coupled to said fiber channel backplane coupling elements via a selected one of the at least two paths;
a serial-to-parallel converter, said serial-to-parallel converter being in a first one of the at least two paths within said disk drive housing and coupled to said ATA disk drive coupling element, wherein said serial-to-parallel converter is capable of receiving a set of serial ATA disk drive signals from a serial ATA disk operatively coupled to the ATA disk drive and emitting a set of parallel ATA disk drive signals; and
a parallel-to-serial converter, said parallel-to-serial converter being in a second one of the at least two paths within said disk drive housing and coupled to said ATA disk drive coupling element, wherein said parallel-to-serial converter is capable of receiving a set of parallel ATA disk drive signals from a parallel ATA disk operatively coupled to the ATA disk drive and emitting a set of serial ATA disk drive signals.

20. Apparatus as in claim 19, wherein each of said fiber channel back-plane coupling elements includes an port capable of being coupled to a power source, whereby said ATA disk drive is capable of receiving input power from a selectable source.

21. Apparatus as in claim 19, wherein said switch includes an input port capable of receiving instructions, said instructions being interpretable by a computing device to control said switch.

22. An apparatus comprising:
an ATA disk drive coupling element capable of being coupled to an ATA disk drive within a disk drive housing having a form factor and electrical interface compatible with a fiber channel disk drive housing;
at least two fiber channel backplane coupling elements;
a first switch coupled to said fiber channel backplane coupling elements, said first switch being capable of being coupled to a switching signal;
a first path from said first switch to said ATA disk drive coupling element, said first path including a serial-to-parallel converter, wherein said serial-to-parallel converter is capable of receiving a set of serial ATA disk drive signals from a serial ATA disk operatively coupled to the ATA disk drive and emitting a set of parallel ATA disk drive signals;

a second path from said first switch to said ATA disk drive coupling element, wherein said second path including a parallel-to-serial converter, wherein said parallel-to-serial converter is capable of receiving a set of parallel ATA disk drive signals from a parallel ATA disk operatively coupled to the ATA disk drive and emitting a set of serial ATA disk drive signals, wherein at least one of said first and second paths is connected to one of said at least two fiber channel backplane coupling elements; and a second switch coupled to said first path and said second path, said second switch being capable of selecting a connection to said ATA disk drive using either said first path or said second path without removing the ATA disk drive from the fiber channel disk drive housing.

23. Apparatus as in claim 22, wherein each of said fiber channel back-plane coupling elements includes an port capable of being coupled to a power source, whereby said ATA disk drive coupling element is capable of receiving input power from a selectable source.

24. Apparatus as in claim 22, wherein said first switch includes an input port capable of receiving instructions, said instructions being interpretable by a computing device to control said first switch.

25. Apparatus as in claim 22, wherein said second switch includes an input port capable of receiving instructions, said instructions being interpretable by a computing device to control said second switch.

26. Apparatus as in claim 22, wherein said second switch is capable of being coupled to a second switching signal.

27. An apparatus comprising:
an adaptor coupled to a disk drive housing to couple an Advanced Technology Attachment (ATA) disk drive within the disk drive housing to one of a plurality of fiber channel backplanes;
a programmable switch coupled to said adaptor to select one out of at least two paths, wherein at least one of said at least two paths is connected to the one of the plurality of fiber channel backplanes, wherein the ATA disk drive is coupled via a selected one of the at least two paths to the one of the plurality of fiber channel backplanes without removing the ATA disk drive from the disk drive housing;
a serial-to-parallel converter in a first path of the at least two paths, coupled to the adaptor to receive a set of serial ATA disk drive signals from a serial ATA disk operatively coupled to the ATA disk drive and to emit a set of parallel ATA disk drive signals; and
a parallel-to-serial converter in a second path of the at least two paths, coupled to the adaptor to receive a set of parallel ATA disk drive signals from a parallel ATA disk operatively coupled to the ATA disk drive and to emit a set of serial ATA disk drive signals.

28. The apparatus of claim 27, wherein the programmable switch includes an input port to receive instructions interpretable by a computing device to control the switch.

29. The apparatus of claim 27, wherein the adaptor comprises:
an ATA disk drive coupling element; and
a plurality of fiber channel backplane coupling elements.

30. The apparatus of claim 29, wherein each of the plurality of fiber channel backplane coupling elements comprises a port to couple to a power source, wherein the ATA disk drive coupling element is operable to receive input power from the power source.

31. A method comprising:
coupling an Advanced Technology Attachment (ATA) disk drive within a disk drive housing via an adaptor to one of a plurality of fiber channel backplanes; and
adapting the ATA disk drive to operate on a serial ATA disk and a parallel ATA disk by
operating a switch in response to a control signal to select one of at least two paths, wherein at least one of said at least two paths is connected to the one of the plurality of fiber channel backplanes, wherein the ATA disk drive is coupled to a selected one of the at least two paths without removing the ATA disk drive from the disk drive housing,
coupling a serial-to-parallel converter to the adaptor via a first one of the at least two paths to receive a set of serial ATA disk drive signals from a serial ATA disk operatively coupled to the ATA disk drive and to emit a set of parallel ATA disk drive signals, and
coupling a parallel-to-serial converter to the adaptor via a second one of the at least two paths to receive a set of parallel ATA disk drive signals from a parallel ATA disk operatively coupled to the ATA disk drive and to emit a set of serial ATA disk drive signals.

32. The method of claim 31, further comprising:
switching between the serial-to-parallel converter and the parallel-to-serial converter in response to a signal.

* * * * *